US007023175B2

(12) United States Patent
Guang et al.

(10) Patent No.: US 7,023,175 B2
(45) Date of Patent: Apr. 4, 2006

(54) BATTERY CELL SIZE DETECTION METHOD

(75) Inventors: Huang Tai Guang, Guangzhou (CN); Li Wen Hua, Huayang (CN); Robert Wentink, Chicago, IL (US)

(73) Assignee: International Components Corporation, Westchester, IL (US)

( * ) Notice: Subject to any disclaimer, the term of this patent is extended or adjusted under 35 U.S.C. 154(b) by 3 days.

(21) Appl. No.: 10/896,654

(22) Filed: Jul. 22, 2004

(65) Prior Publication Data

US 2005/0275369 A1 Dec. 15, 2005

Related U.S. Application Data

(63) Continuation-in-part of application No. 10/863,920, filed on Jun. 9, 2004.

(51) Int. Cl.
*H02J 7/00* (2006.01)

(52) U.S. Cl. ........................................................ 320/106

(58) Field of Classification Search ................ 320/106, 320/107, 110, 112, 134; 713/300
See application file for complete search history.

(56) References Cited

U.S. PATENT DOCUMENTS 5,122,722 A * 6/1992 Goedken et al. ............ 320/116
5,157,320 A * 10/1992 Kuriloff
5,218,286 A * 6/1993 VanDunk
5,606,238 A 2/1997 Spellman et al. ........... 320/110
5,606,242 A * 2/1997 Hull et al.
5,689,171 A * 11/1997 Ludewig
5,764,030 A 6/1998 Gaza .......................... 320/116
5,861,729 A 1/1999 Maeda et al. ............... 320/106
5,903,764 A * 5/1999 Shyr et al. .................. 713/300
5,920,179 A * 7/1999 Pedicini
5,998,966 A 12/1999 Gaza .......................... 320/116

(Continued)

OTHER PUBLICATIONS http://www.sbs-forum.org/specs/sbdat110.pdf, Smart Battery Data Specification, Revision 1.1, Dec. 11, 1998.*

*Primary Examiner*—Pia Tibbits
(74) *Attorney, Agent, or Firm*—Katten Muchin Rosenman LLP; John S. Paniaguas

(57) ABSTRACT

A battery charger that is configured to charge different size battery cells and automatically determine the size of the battery cell to be charged. The battery charger includes at least one charging circuit and a microprocessor. The charging circuit, in turn, includes a serially connected switching device and a current sensing resistor and a first and second pair of battery terminals that are configured to receive different size battery cells. The first pair of battery terminals is serially connected to a size detection resistor. The serial combination of the first pair of battery terminals and the size detection resistor is connected in parallel with a second pair of battery terminals. The parallel combination is connected in series with the charging circuit. At a nominal charging current, the voltage at the battery terminals will vary by the voltage drop across the size detection resistor. Accordingly, by measuring the voltage at the battery terminals, the system can determine which pair of battery terminals is connected to a battery cell. By configuring the first pair of battery terminals to receive a first battery cell size, for example, size AAA, and serially coupling the first pair of battery terminals to the size detection resistor, and configuring the second pair of battery terminals to receive a second size of battery cell, for example, size AA, the battery cell size can easily be detected electronically by measuring the voltage at the battery terminals.

10 Claims, 8 Drawing Sheets

U.S. PATENT DOCUMENTS 6,037,756 A 3/2000 Pong .......................... 323/222
6,118,255 A * 9/2000 Nagai et al.
6,157,173 A * 12/2000 Baranowski et al.
6,304,062 B1 * 10/2001 Batson ....................... 320/134
6,346,794 B1 * 2/2002 Odaohhara
6,384,575 B1 5/2002 Chen .......................... 320/110
6,522,101 B1 * 2/2003 Malackowski
6,528,969 B1 3/2003 Tung .......................... 320/103
6,610,941 B1 8/2003 Pfeiffer ................ 200/61.58 R

* cited by examiner

BATTERY CELL SIZE DETECTION METHOD

CROSS REFERENCE TO RELATED APPLICATIONS

This application is a continuation-in-part of commonly owned copending U.S. patent application Ser. No. 10/863,920, filed on Jun. 9, 2004, entitled "Multiple Cell Battery Charger Configured with a Parallel Topology".

BACKGROUND OF THE INVENTION

1. Field of the Invention

The present invention relates to a battery charger and more particularly, to a battery charger that is adapted to charge different size battery cells, such as AA and AAA battery cells, in which the battery charger can automatically distinguish between different size battery cells in order to provide the battery cell with the proper charging characteristic.

2. Description of the Prior Art

Various portable devices and appliances are known to use multiple rechargeable battery cells, such as AA and AAA battery cells. In order to facilitate charging of the battery cells for such multiple cell appliances, multiple cell battery chargers have been developed. Many known battery chargers are configured to receive battery cells having different sizes, such as AA and AAA battery cells. Because the charging characteristics of different size battery cells are different, various mechanical configurations have been developed to sense the size of the battery cell inserted into the charging terminals of the battery charger and properly configure the battery charger for the correct battery cell.

For example, U.S. Pat. Nos. 5,606,238; 6,384,575; and 6,610,941 disclose battery chargers with different mechanical configurations for detecting the size of a battery cell. For example, Rayovac U.S. Pat. No. 5,606,238 discloses a mechanical configuration for sensing the size of a battery cell inserted into the battery charger for charging. A front wall of the battery compartment is formed with a number of apertures sized to coincide with the diameter of various battery cell cathodes. The apertures are located so that when a battery cell is fully inserted within the battery compartment, the cathodes of the cell are received in one of the apertures. The cathode contacts are disposed behind the apertures. The anode in the battery compartment is formed from a leaf spring and is used to bias the battery cell toward the cathode. There are several problems with such a configuration. For example, the mechanical sensing configuration is dependent upon the diameter of the cathode which varies from manufacturer to manufacturer. In addition, the leaf spring may eventually lose its spring tension due to metal fatigue.

U.S. Pat. No. 6,384,575, assigned to Delta Electronics, Inc. of Taiwan, discloses a different type of battery cell mechanical sensing arrangement for a battery charger. This battery charger includes a anode contact and a rotatable cathode contact. When the rotatable cathode contact is in a first position, it is adapted to receive a battery cell of a first longer length. In a second position, the pivotal cathode contact is adapted to receive battery cells of a shorter length. The mechanical sensing arrangement disclosed in the '575 patent requires the user to rotate the rotatable contact before inserting the battery cell in the battery compartment in order to select the appropriate configuration for the battery cell to be charged. Such an operation is cumbersome for the user.

U.S. Pat. No. 6,610,941 discloses another configuration for mechanically sensing the size of the battery cell. This arrangement uses a slide device and a two-prong fork. The configuration disclosed in the '941 patent is used to sense AAA, AA, C, and D-type batteries. The two-prong fork is pivotally mounted. The prongs of the fork are spaced apart at a distance less than the diameter of a type-C battery. The two-prong fork is also rotatably mounted so that when a type-C or D battery is inserted into the battery compartment, a two-prong fork is pushed downwardly. The actuation of the two-prong fork operates a switch which provides an electrical representation of whether type C/D or type AA/AAA batteries have been installed in the battery compartment. The anode is connected to a slider assembly, which, in turn, actuates a switch depending on the length of the battery cell inserted into the battery compartment. Thus, the combination of the two switches can be used to identify the type of battery that has been inserted into the battery compartment.

Such mechanical systems for sensing the size of a battery cell are relatively cumbersome and are subject to wear and are relatively expensive. As such, systems have been developed for electronically determining the size of a battery cell. For example, commonly owned U.S. Pat. Nos. 5,764,030 and 5,998,966 disclose a system for electrically-sensing the battery size and type of smart batteries. Such smart batteries normally include an internal microprocessor that is adapted to communicate with a microprocessor in the battery charger and thus provide data to the battery charger relating to the size of battery cells in the smart battery pack. Unfortunately, the techniques disclosed in the '030 and '966 patents are not suitable for batteries other than smart battery packs.

Fujitsu, U.S. Pat. No. 5,861,729, discloses a battery charger which can electrically distinguish between NiH and NiCd battery based on [FILL IN DETAILS]. Thus there is a need for a battery charger which can effectively and inexpensively distinguish between different size battery cells which are not part of a smart battery pack.

SUMMARY OF THE INVENTION

Briefly, the present invention relates to a battery charger that is configured to charge different size battery cells which can automatically determine the size of the battery cell to be charged. The battery charger includes at least one charging circuit and a microprocessor. The charging circuit, in turn, includes a serially connected switching device and a current sensing resistor and a first and second pair of battery terminals that are configured to receive different size battery cells. The first pair of battery terminals is serially connected to a size detection resistor. The serial combination of the first pair of battery terminals and the size detection resistor is connected in parallel with a second pair of battery terminals. The parallel combination is connected in series with the charging circuit. At a nominal charging current, the voltage at the battery terminals will vary by the voltage drop across the size detection resistor. Accordingly, by measuring the voltage at the battery terminals, the system can determine which pair of battery terminals is connected to a battery cell. By configuring the first pair of battery terminals to receive a first battery cell size, for example, size AAA, and serially coupling the first pair of battery terminals to the size detection resistor, and configuring the second pair of battery terminals to receive a second size of battery cell, for example, size AA, the battery cell size can easily be detected electronically by measuring the voltage at the battery terminals.

DESCRIPTION OF THE DRAWING

These and other advantages of the present invention will be readily understood with reference to the following specification and attached drawing wherein.

DETAILED DESCRIPTION

Figure 1:
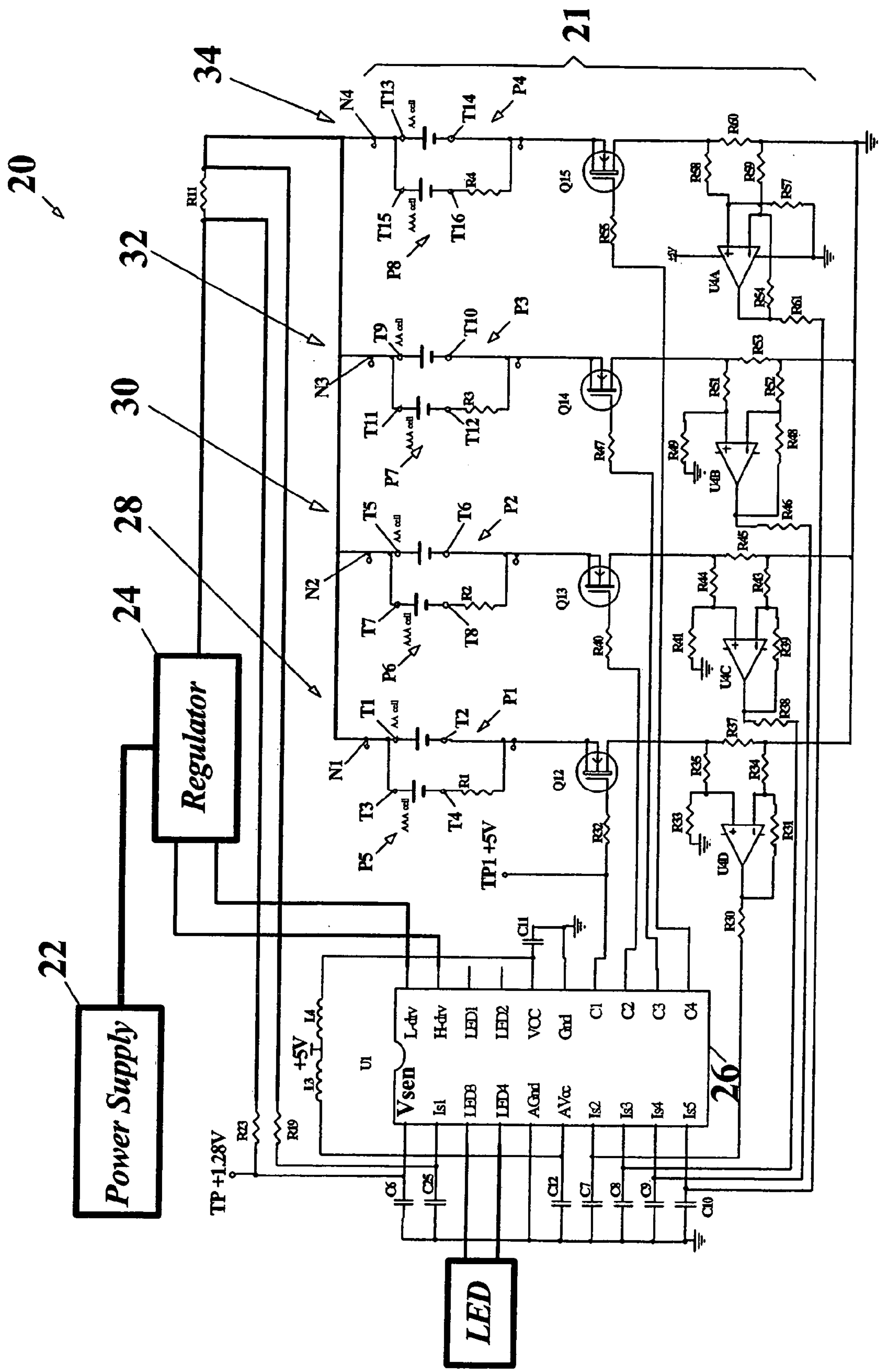
FIG. 1 is a schematic diagram of a battery charger that can electronically sense the size of the battery cell to be charged in accordance with the present invention.

The present invention relates to a multiple cell battery charger configured to charge different size battery cells In accordance with an important aspect of the invention the battery charger is provided with multiple pockets for receiving battery cells having different sizes and can automatically determine the size of the battery cell populated in one of the pockets.

In general, the battery charger 20 includes at least one charging circuit, such as the charging circuit 21 and a microprocessor 26. The charging circuit 21, in turn, includes a switching device Q12, Q13, Q14 and Q15; a serially connected current sensing resistor R37, R45, R53 and R60 and one or more pairs of first and second pair of battery terminals T1,T2 and T3,T4; T5,T6 and T7,T8; T9,TI0 and TI1,T12; T13,T14 and T15,T16, respectively, that are configured to receive different size battery cells, for example size M and AA. Each pair of battery terminals T1,T2 T3,T4; T5,T6; T7,T8; T9,T10; T11,T12; T13,T14; T15,T16, defines a pocket. Each of the first pairs of battery terminals T3,T4; T7,T8; T11,T12; T15,T16, is serially connected to a size detection resistor R1, R2, R3 and R4. The serial combination of the first pair of battery terminals T3,T4; T7,T8; T11,T12; T15,T16 and the size detection resistor R1, R2, R3 and R4 is connected in parallel with the second pair of battery terminals T1,T2; T5,T6; T9,T10; and T13,T14. The parallel combination is connected in series with the charging circuit 21.

At a nominal charging current, for example 750 milliamps, the voltage at the battery terminals will vary by an amount approximately equivalent to the voltage drop across the size detection resistor R1, R2, R3 and R4. Accordingly, by individually measuring the voltage at the nodes N1, N2, N3, and N4, defined by the battery terminals T1,T3; T5,T7; T9,T11; and T13,T15, the system can determine which pair of battery terminals is connected to a battery cell. For example, the first pair of battery terminals may be configured to receive a first battery cell size, for example, size AAA, and configuring the second pair of battery terminals to receive a second size of battery cell, for example, size AA, the nominal voltage of such battery cells is in the range of 1.2–1.5 volts DC. By sizing the size detection resistors R1, R2, R3 and R4 so that at the nominal charging current of, for example, 750 milliamps, the voltage drop across the size detection resistors R1, R2, R3 and R4 is about 0.5 volts DC, measurement of the voltage at the nodes will either be the nominal battery cell voltage of 1.2–1.5 volts if, for example, a AA battery cell is populated in one of the pockets P1, P2, P3 and P4 defined by the second pair of battery terminals T1,T2; T5,T6; T9,T10; and T13,T14. Alternatively, if a, for example, AAA battery cell is populated in one of the pockets P5, P6, P7 and P8 defined by first pair of battery terminals T3,T4; T7,T8; TI1,T12; T15,T16 that are serially connected to one of the size detection resistors R1, R2, R3 and R4, the voltage at the nodes N1, N2, N3, and N4 at a nominal charging current of 750 milliamps will be in the range of 1.7–2.0 volts DC. Thus, the microprocessor 26 can periodically sense the voltage at the nodes N1, N2, N3 and N4 at its port $V_{sen}$ or alternatively at its port $I_{s1}$.

Exemplary Battery Charger

An exemplary battery charger with a parallel topology is described and illustrated below which can automatically sense the size of the battery cell to be charged. However, the principles of the present invention are applicable to various types of battery chargers, for example, battery chargers having either a parallel or serial topology.

Referring to FIG. 1, the exemplary battery charger is generally identified with the reference 20 and includes a power supply 22 and a regulator 24. In an AC application, the power supply 22 is configured to receive a source of AC power, such as 120 volts AC, and convert it to a non-regulated source of DC power by way of a bridge rectifier (not shown), for example. or other device, such as a switched mode power supply. In DC applications, the power supply 22 may simply be a unregulated source of DC, for example in the range of 10 to 16 volts DC, such as a vehicular power adapter from an automobile. The unregulated source of DC power from the power supply 22 may be applied to, for example, to a regulator, such as, a DC buck regulator 24, which generates a regulated source of DC power, which, in turn, is applied to the battery cells to be charged.

The regulator 24 may be an integrated circuit (IC) or formed from discrete components. The regulator 24 may be, for example, a switching type regulator which generates a pulse width modulated (PWM) signal at its output. The regulator 24 may be a synchronous buck regulator 24, for example, a Linear Technology Model No. LTC 1736, a Fairchild Semiconductor Model No. RC5057; a Fairchild Semiconductor Model No. FAN5234; or a Linear Technology Model No. LTC1709-85 or others.

The output of the regulator 24 may optionally be controlled by way of a feedback loop. In particular, a total charging current sensing device, such as a sensing resistor R11, may be serially coupled to the output of the regulator 24. The sensing resistor R11 may be used to measure the total charging current supplied by the regulator 24. The value of the total charging current may be dropped across the sensing resistor R11 and sensed by a microprocessor 26. The microprocessor 26 may be programmed to control the regulator 24, as will be discussed in more detail below, to control the regulator 24 based on the state of charge of the battery cells being charged.

As shown in FIG. 1, the battery charger 20 may optionally be configured with more than one channel, for example, four channels 28, 30, 32 and 34. Each channel 28, 30, 32 and 34 is configured with two pockets P1,P5; P2,P6; P3,P7; and P4,P8; respectively. As discussed above, each channel 28, 30, 32 and 34 is formed as a charging circuit 21 which includes two pockets P1,P5; P2,P6; P3,P7; and P4,P8; that are serially connected to a switching device, such as a field effect transistor (FET) Q12, Q13, Q14 and Q15. The source and drain terminals of each of the FETs Q12, Q13, Q14 and Q15 are serially connected to the pockets P1,P5; P2,P6;

P3,P7; and P4,P8. In order to sense the charging current supplied to each of the pockets P1,P5; P2,P6; P3,P7; and P4,P8, a current sensing devices, such as a sensing resistors R37, R45, R53, R60, may be serially coupled to the serial combination of the FETs Q12, Q13, Q14 and Q15; and the pockets P1,P5; P2,P6; P3,P7; and P4,P8. The serial combination of the pockets P1,P5; P2,P6; P3,P7; and P4,P8; FETs Q12, Q13, Q14 and Q15; and the optional charging current sensing devices R37, R45, R53 and R60, respectively, form a charging circuit 21 for each channel 28, 30, 32 and 34. These charging circuits 21, in turn, in the exemplary charger illustrated in FIG. 1 are connected together in parallel.

The charging current supplied to each of the battery pockets P1,P5; P2,P6; P3,P7; and P4,P8 can vary due to the differences in charge, as well as the internal resistance of the circuit and the various battery cells populated within the pockets P1,P5; P2,P6; P3,P7; and P4,P8. This charging current as well as the cell voltage and optionally the cell temperature may be sensed by the microprocessor 26. In accordance with an important aspect of the present invention, the multiple cell battery charger 20 may be configured to optionally sense the charging current and cell voltage of each of the battery cells 28, 30, 32 and 34, separately. This may be done by control of the serially connected FETS Q12, Q13, Q14 and Q15. For example, in order to measure the cell voltage of an individual cell, such as the cell 28, the FET Q12 is turned on while the FETs Q13, Q14 and Q15 are turned off. When the FET 12 is turned on, the anode of the cell 28 is connected to system ground. The cathode of the cell is connected to the $V_{sen}$ terminal of the microprocessor 26. The cell voltage is thus sensed at the terminal $V_{sen}$.

As discussed above, the regulator 24 may be controlled by the microprocessor 26. In particular, the magnitude of the total charging current supplied to the battery cells within the pockets P1,P5; P2,P6; P3,P7; and P4,P8 may be used to determine the pulse width of the switched regulator circuit 24. More particularly, as mentioned above, the sensing resistor R11 may be used to sense the total charging current from the regulator 24. In particular, the charging current is dropped across the sensing resistor R11 to generate a voltage that is read by the microprocessor 26. This charging current may be used to control the regulator 24 and specifically the pulse width of the output pulse of the pulse width modulated signal forming a closed feedback loop. In another embodiment of the invention, the amount of charging current applied to the individual cells Q12, Q13, Q14 and Q15 may be sensed by way of the respective sensing resistors R37, R45, R53 and R60 and used for control of the regulator 24 either by itself or in combination with the total output current from the regulator 24. In other embodiments of the invention, the charging current to one or more of the battery cells within the pockets P1,P5; P2,P6; P3,P7; and P4,P8 may be used for control.

In operation, during a charging mode, the pulse width of the regulator 24 is set to an initial value. Due to the differences in internal resistance and state of charge of each of the battery cells within the pockets P1,P5; P2,P6; P3,P7; and P4,P8 at any given time, any individual cells which reach their fully charged state, as indicated by its respective cell voltage, as measured by the microprocessor 26. More particularly, when the microprocessor 26 senses that any of the battery cells within any of the pockets P1,P5; P2,P6; P3,P7; and P4,P8 are fully charged, the microprocessor 26 drives the respective FETs Q12, Q13, Q14, or Q15 open in order to disconnect the respective battery cell from the circuit. Since the battery cells are actually disconnected from the circuit, no additional active devices are required to protect the cells from discharge.

As mentioned above, the charging current to each of the battery cells within the pockets P1,P5; P2,P6; P3,P7; and P4,P8 is dropped across a sensing resistor R37, R45, R53 and R60. This voltage may be scaled by way of a voltage divider circuit, which may include a plurality of resistors R30, R31, R33 and R34, R35, R38, R39, R41, R43, R44, R46, R48, R49, R51, R52, R54, R57, R58, R59, R61, as well as a plurality of operational amplifiers U4A, U4B, U4C and U4D. For brevity, only the amplifier circuit for the first channel 28 is described. The other amplifier circuits operate in a similar manner. In particular, for the battery cell populated in channel 28, the charging current through the battery cell is dropped across the resistor R37. That voltage drop is applied across a non-inverting input and inverting input of the operational amplifier U4D.

The resistors R31, R33, R34, and R35 and the operational amplifier U4D form a current amplifier. In order to eliminate the off-set voltage, the value of the resistors R33 and R31 value are selected to be the same and the values of the resistors R34 and R35 value are also selected to be the same. The output voltage of the operational amplifier U4D=voltage drop across the resistor R37 multiplied by the quotient of the resistor value R31 resistance value divided by the resistor value R34. The amplified signal at the output of the operational amplifier U4D is applied to the microprocessor 26 by way of the resistor R30. The amplifier circuits for the other battery cells 30, 32, and 34 operate in a similar manner.

Charge Termination Techniques

The principles of the present invention are applicable to battery chargers with various charge termination techniques, such as temperature, pressure, negative delta, and peak cut-out techniques. These techniques can be implemented relatively easily by program control and are best understood with reference to FIG. 2. For example, as shown, three different characteristics as a function of time are shown for an exemplary nickel metal hydride (NiMH) battery cell during charging. In particular, the curve 40 illustrates the cell voltage as a function of time. The curves 42 and 44 illustrate the pressure and temperature characteristics, respectively, of a NiMH battery cell under charge as a function of time.

In addition to the charge termination techniques mentioned above, various other charge termination techniques the principles of the invention are applicable to other charge termination techniques as well. For example, a peak cut-out charge termination technique, for example, as described and illustrated in U.S. Pat. No. 5,519,302, hereby incorporated by reference, can also be implemented. Other charge termination techniques are also suitable.

Figure 2:
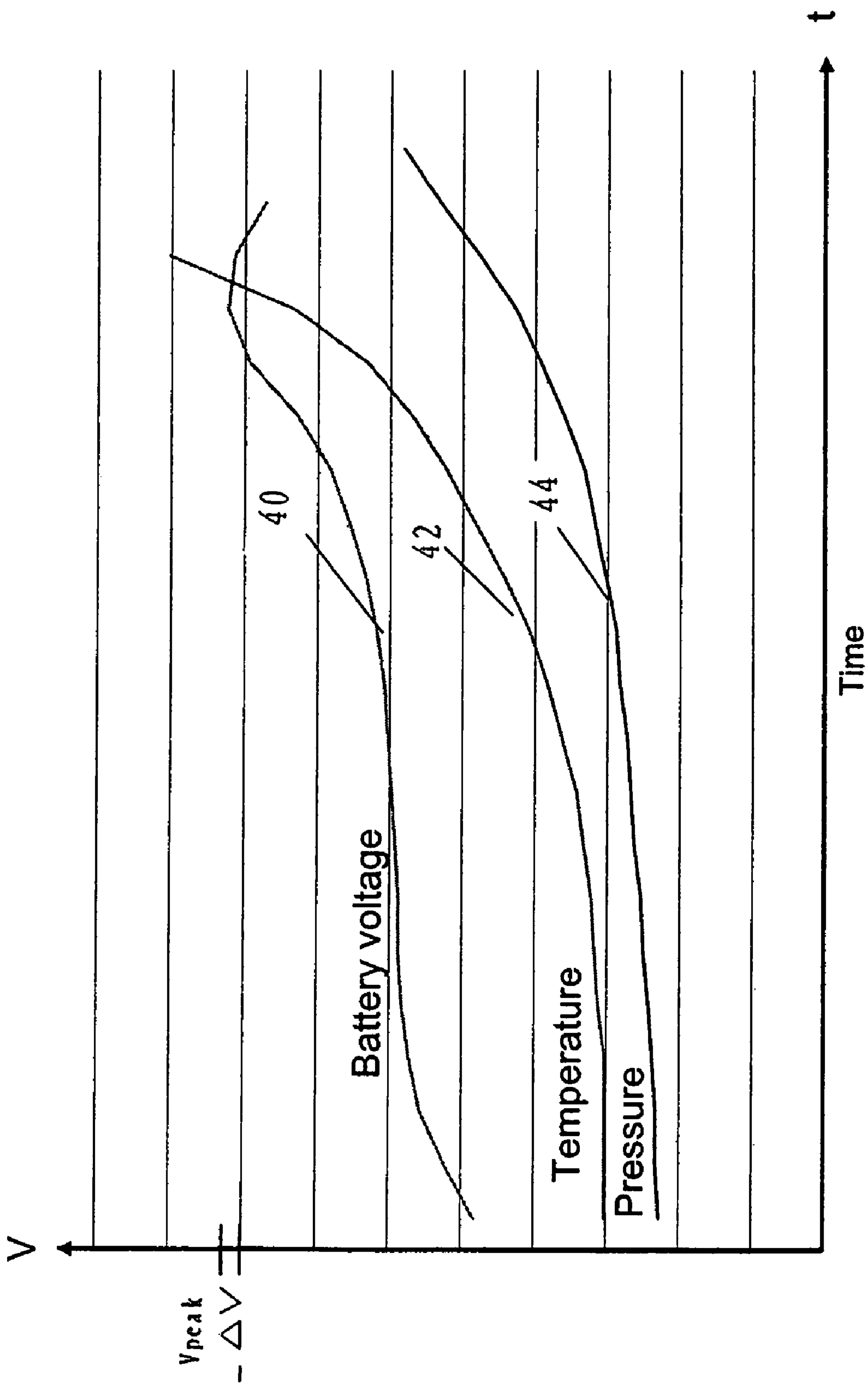
FIG. 2 is an exemplary graphical illustration of the voltage, pressure, and temperature charging characteristics as a function of time for an exemplary NiMH battery.

FIG. 2 illustrates an exemplary characteristic curve 40 for an exemplary NIMH or NiCd battery showing the relationship among current, voltage and temperature during charge. More particularly, the curve 40 illustrates the cell voltage of an exemplary battery cell under charge. In response to a constant voltage charge, the battery cell voltage, as indicated by the curve 40, steadily increases over time until a peak voltage value $V_{peak}$ is reached as shown. As illustrated by the curve 44, the temperature of the battery cell under charge also increases as a function of time. After the battery cell reaches its peak voltage $V_{peak}$, continued charging at the increased temperature causes the battery cell voltage to drop. This drop in cell voltage can be detected and used as an indication that the battery's cell is fully charged. This charge termination technique is known as the negative delta V technique.

As discussed above, other known charge termination techniques are based on pressure and temperature. These charge termination techniques rely upon physical characteristics of the battery cell during charging. These charge termination techniques are best understood with respect to FIG. 2. In particular, the characteristic curve 42 illustrates the internal pressure of a NiMH battery cell during charging while the curve 44 indicates the temperature of a NiMH battery cell during testing. The pressure-based charge termination technique is adapted to be used with battery cells with internal pressure switches, such as the Rayovac in-cell charge control (I-$C^3$)[1], NiMH battery cells, which have an internal pressure switch coupled to one or the other anode or cathode of the battery cell. With such a battery cell, as the pressure of the cell builds up due to continued charging, the internal pressure switch opens, thus disconnecting the battery cell from the charger.

(I-$C^3$) is a trademark of the Rayovac Corporation.

Temperature can also be used as a charge termination technique. As illustrated by the characteristic curve 44, the temperature increases rather gradually. After a predetermined time period, the slope of the temperature curve becomes relatively steep. This slope, dT/dt may be used as a method for terminating battery charge.

The battery charge in accordance with the present invention can also utilize other known charge termination techniques. For example, in U.S. Pat. No. 5,519,302 discloses a peak cut-out charge termination technique in which the battery voltage and temperature is sensed. With this technique, a load is attached to the battery during charging. The battery charging is terminated when the peak voltage is reached and reactivated as a function of the temperature.

Software Control

FIGS. 3A–3E illustrate exemplary flow charts for control of a multiple cell battery charger provided with multiple pockets for receiving battery cells having different sizes. FIG. 4 is a flow chart which illustrates the system in accordance with the present invention for automatically detecting the size of a battery cell populated in one of the battery charger pockets.

Figure 3A:
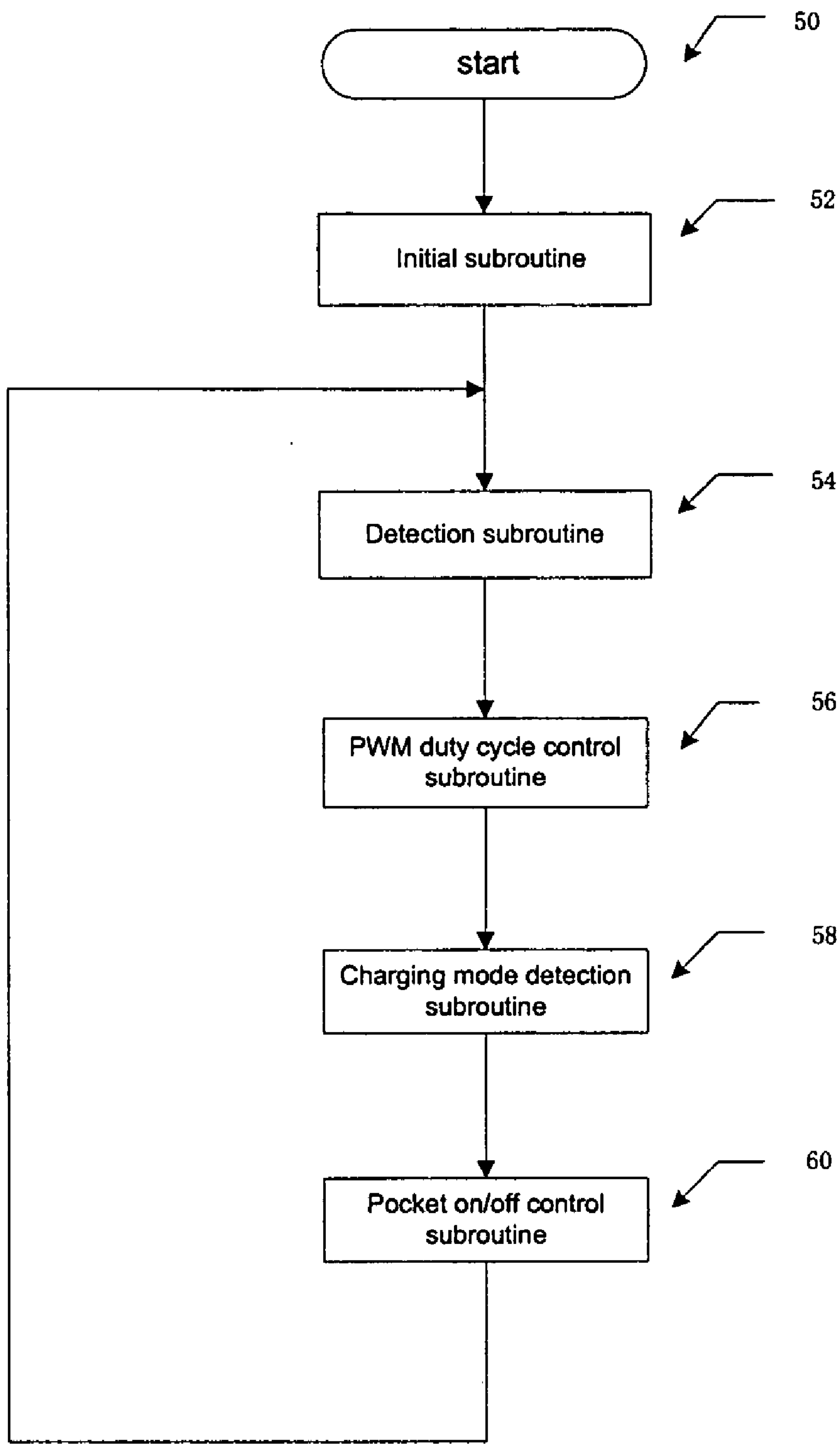
FIGS. 3A–3E illustrate exemplary flow charts for the battery charger illustrated in FIG. 1.
Figure 4:
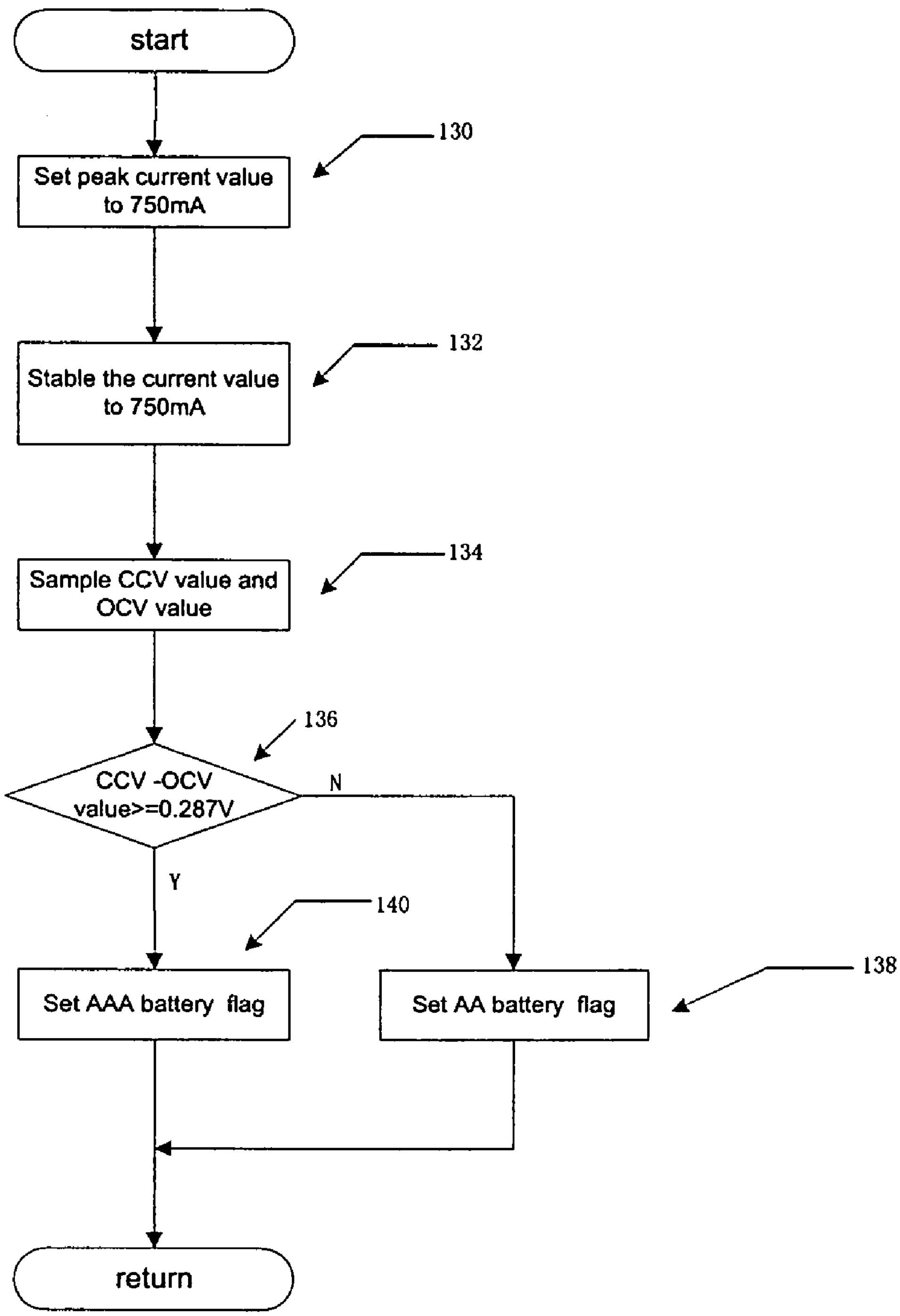
FIG. 4 is flow chart for a battery charger which illustrates a battery cell size detection method in accordance with the present invention.

Referring to the main program, as illustrated in FIG. 3A, the main program is started upon power-up of the microprocessor 26 in step 50. Upon power-up, the microprocessor 26 initializes various registers and closes all of the FETs Q12, Q13, Q14, and Q15 in step 52. The microprocessor 26 also sets the pulse-width of the PWM output of the regulated 24 to a nominal value. After the system is initialized in step 52, the voltages across the current sensing resistors R37, R45, R53, and R60 are sensed to determine if any battery cells are currently in any of the pockets P1,P5; P2,P6; P3,P7; and P4,P8 in step 54. If the battery cell is detected in one of the pockets P1,P5; P2,P6; P3,P7; and P4,P8, the system control proceeds to step 56 in which the duty cycle of the PWM out-put of the regulator 24 is set. In step 58, a charging mode is determined. After the charging mode is determined, the microprocessor 26 takes control of the various pockets P1,P5; P2,P6; P3,P7; and P4,P8 in step 60 and loops back to step 54.

Figure 3B:
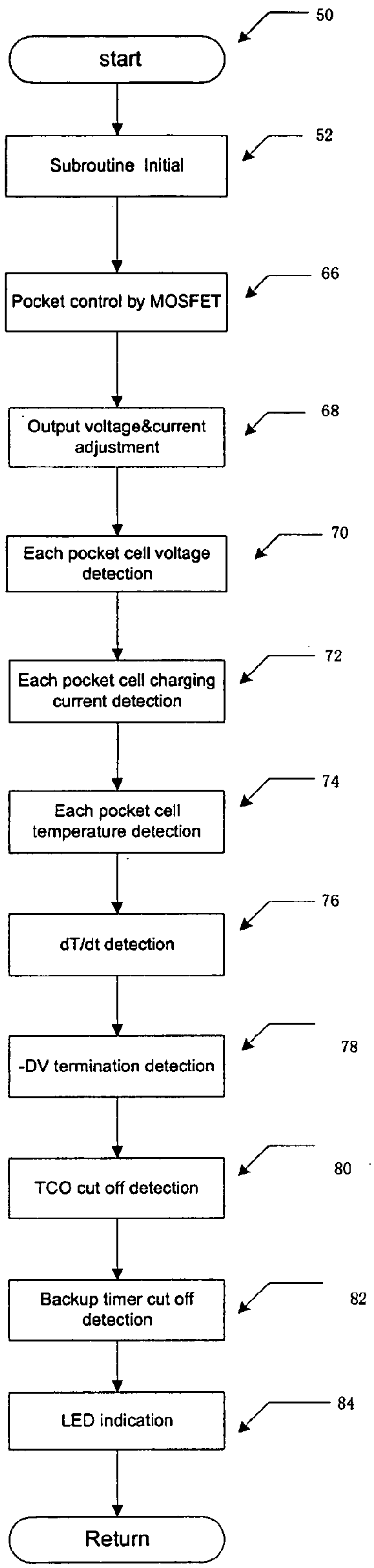

A more detailed flow-chart is illustrated in FIG. 3B. Initially, in step 50, the system is started upon power-up of the microprocessor 26. On start-up, the system is initialized in step 52, as discussed above. As mentioned above, the exemplary battery charger 20 includes at least one charging circuit 21. Each of the charging circuit 21 includes a switching device, such as a MOSFETs Q12, Q13, Q14, or Q15, serially coupled to the battery terminals. As such, each charging circuit 21 may be controlled by turning the MOSFETs on or off, as indicated in step 66 and discussed in more detail below. In step 68, the output voltage and current of the regulator 24 is adjusted to a nominal value by the microprocessor 26. After the regulator output is adjusted, a state of the battery cell is checked in step 70. As mentioned above, various charge termination techniques can be used with the present invention. Subsequent to step 70, the charging current is detected in step 72 by measuring the charging current dropped across the current sensing resistors R37, R45, R53, or R60.

One or more temperature based charge termination techniques may be implemented. If so, a thermistor may be provided to measure the external temperature of the battery cell. One such technique is based on dT/dt. Another technique relates to temperature cut off (TCO). If one or more of the temperature based techniques are implemented, the temperature is measured in step 74. If a dT/dt charge termination technique is utilized, the temperature is taken along various points along the curve 44 (FIG. 2) to determine the slope of the curve. When the slope is greater than a predetermined threshold, the FET for that cell is turned off in step 76.

As mentioned above, the system may optionally be provided with negative delta V charge termination. Thus, in step 78, the system may constantly monitor the cell voltage by turning off all but one of the switching devices Q12, Q13, Q14, and Q15 and measuring the cell voltage along the curve 40 (FIG. 2). When the system detects a drop in cell voltage relative to the peak voltage $V_{sen}$, the system loops back to step 66 to turn off the switching device Q12, Q13, Q14, and Q15 for that battery cell.

As mentioned above, a temperature cut-off (TCO) charge termination technique may be implemented. This charge termination technique requires that the temperature of the cells 28, 30, 32 and 34 to be periodically monitored. Should the temperature of any the cells 28, 30, 32 and 34 exceed a predetermined value, the FET for that cell is turned off in step 80. In step 82, the charging time of the cells 28, 30, 32, and 34 is individually monitored. When the charging time exceeds a predetermined value, the FET for that cell is turned off in step 82. A LED indication may be provided in step 84 indicating that the battery is being charged.

Figure 3C:
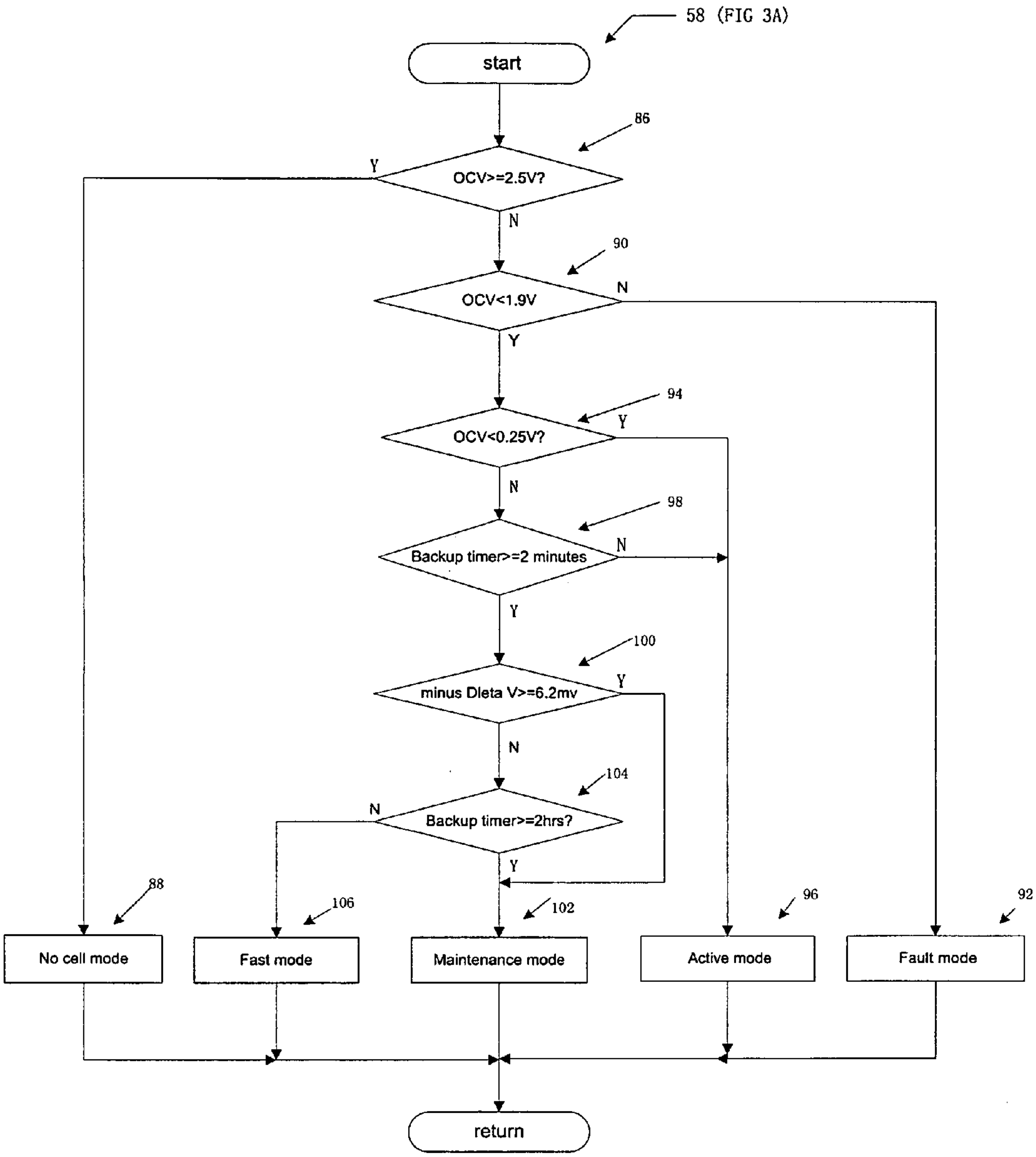

FIG. 3C illustrates a subroutine for charging mode detection. This subroutine may be used to optionally indicate whether the battery charger 20 is in a "no-cell" mode; "main-charge" mode; "maintenance-charge" mode; an "active" mode; or a "fault" mode. This subroutine corresponds to the block 58 in FIG. 3A. The system executes the charging mode detection subroutine for each cell being charged. Initially, the system checks in step 86 the open-circuit voltage of the battery cell by checking the voltage at terminal $V_{sen}$ of the microprocessor 26. If the open-circuit voltage is greater than or equal to a predetermined voltage, for example, 2.50 volts, the system assumes that no battery cell is in the pocket, as indicated in step 88. If the open-circuit voltage is not greater than 2.50 volts, the system proceeds to step 90 and checks whether the open-circuit voltage is less than, for example, 1.90 volts. If the open circuit voltage is not less than 1.90 volts, the system indicates a fault mode in step 92. If the open-circuit voltage is less than 1.90 volts, the system proceeds to step 94 and checks whether the open-circuit voltage is less than, for example, 0.25 volts. If so, the system returns an indication that the battery charger is in inactive mode in step 96. If the open-circuit voltage is not less than, for example, 0.25 volts, the system proceeds to step 98 and checks whether a back-up timer, is greater than or equal to, for example, two minutes. If not, the system returns an indication that battery charger 20 is in the active mode in step 96. If the more than, for example, two minutes has elapsed, the system checks in step 100 whether the battery cell voltage has decreased more than a predetermined value, for example, 6.2 millivolts. If so, the system returns an indication in step 102 of a maintenance mode. If not, the system proceeds to step 104 and determines whether the back-up timer is greater or equal to a maintenance time period, such as two hours. If not, the system returns an indication in step 106 of a main charge mode. If more than two hours, for example has elapsed, the system-returns an indication in step 102 of a maintenance mode.

Figure 3D:
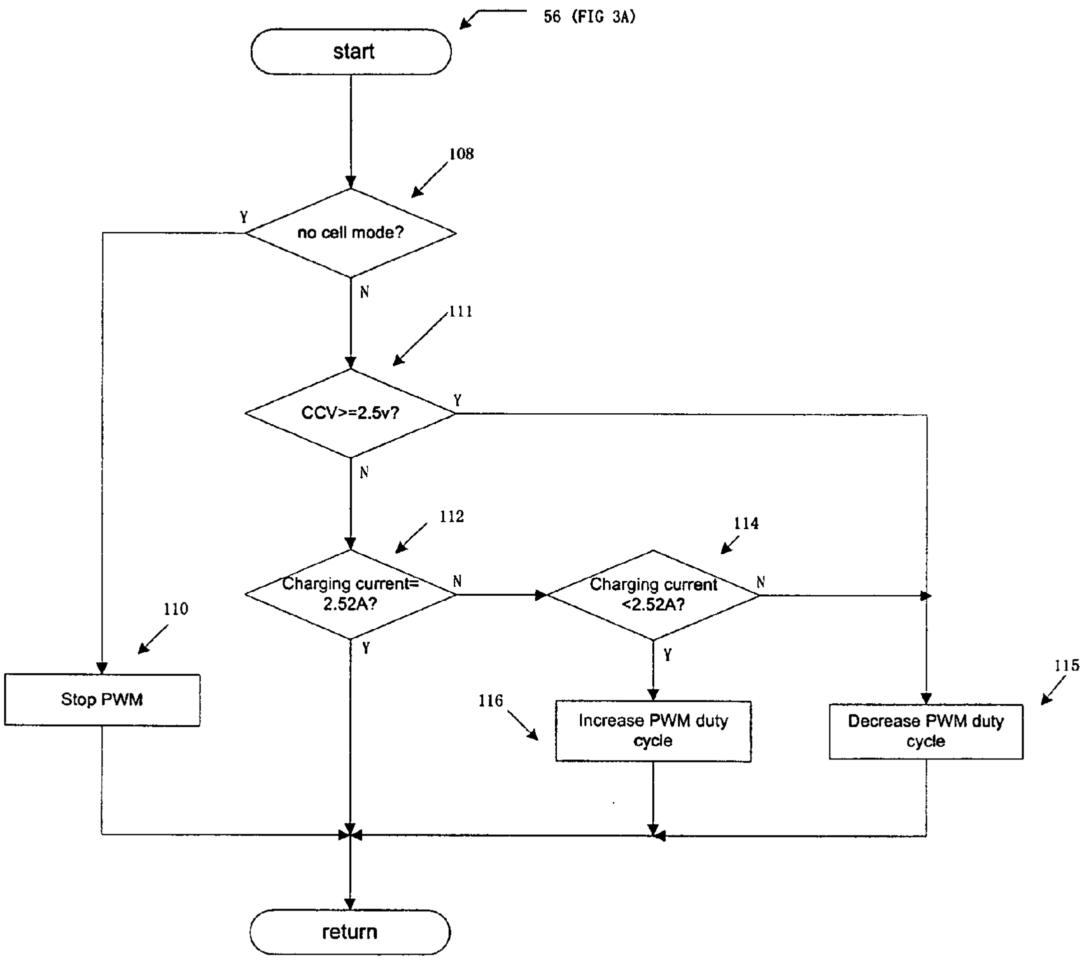

FIG. 3D illustrates a subroutine for the PWM duty cycle control. This subroutine corresponds to block 56 in FIG. 3A. This subroutine initially checks whether or not a cell is present in the pocket in step 108 as indicated above. If there is no cell in the pocket, the duty cycle of the PWM is set to zero in step 110. When there is a battery cell being charged, the PWM output current of the regulator 24 is sensed by the microprocessor 26 by way of sensing resistor R11. The microprocessor 26 uses the output current of the regulator 24 to control the PWM duty cycle of the regulator 24. Since the total output current from the regulator 24 is dropped across the resistor R11, the system checks in step 111 whether the voltage Vsen is greater than a predetermined value, for example, 2.50 volts in step 111. If so, the PWM duty cycle is decreased in step 115. If not, the system checks whether the total charging current for four pockets equal a predetermined value. If so, the system returns to the main program. If not, the system checks in step 114 whether the charging current is less than a preset value. If not, the PWM duty cycle is decreased in step 115. If so, the PWM duty cycle is increased in step 116.

Figure 3E:
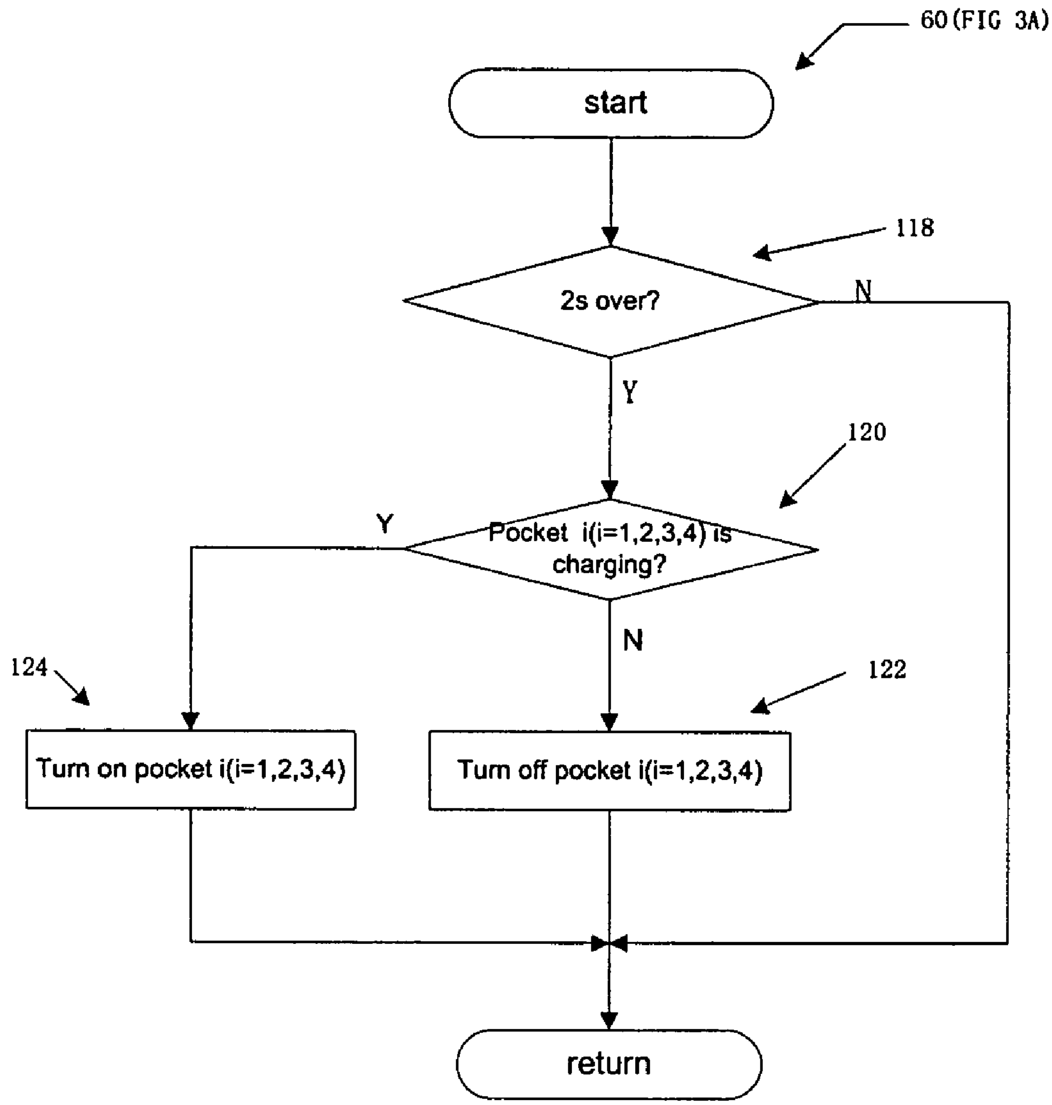

The pocket on-off subroutine is illustrated in FIG. 3E. This subroutine corresponds to the block 60 in FIG. 3A. Initially, the system checks in step 118 whether the battery cell in the first pocket (i.e. channel 1) has been fully charged. If not, the system continues in the main program in FIG. 3A, as discussed above. If so, the system checks in step 120 which channels (i.e pockets) are charging in order to take appropriate action. For example, if channel 1 and channel 2 are charging and channel 3 and channel 4 are not charging, the system moves to step 122 and turns off channel 3 and channel 4, by turning off the switching devices Q14 and Q15. and moves to step 124 and turns on channel 1 and channel 2, by turning on the switching device Q12 and Q13.

As discussed above, the channels 28, 30, 32 and 34 refer to the individual charging circuits 21 which include the switching devices Q12, Q13, Q14, and Q15. The channels 28, 30, 32 and 34 are controlled by way of the switching devices Q12, Q13, Q14 or Q14 being turned on or off by the microprocessor 26.

FIG. 4 is a flow chart illustrating the method for detecting the size of the battery cell populated in one of the pockets P1, P2, P3, P4, P5, P6, P7, and P8. Initially in step 130, a nominal charging current, for example, 750 milliamperes is applied to one channel 28, 30, 32 or 34. In particular, the microprocessor 26 turns off three of the four switching devices and adjusts the pulse width of its H-drv and L-drv ports. As discussed above, these ports H-drv and L-drv are used to drive the regulator 24. The sensing resistor R11 is used to sense the output current being supplied by the regulator 24. The voltage drop across the resistor R11 is sensed by the microprocessor 26 at port $V_{sen}$ forming a feedback loop that is used to stabilize the nominal current output of the regulator in step 132. Next in step 134, the system samples both the open circuit voltage (OCV) and the closed circuit voltage (CCV) at the node N1, N2, N3 and N4 for the respective channel 28, 30, 32 and 34 under consideration. The OCV for each channel 28, 30, 32 and 34 is determined by turning off the respective switching device Q12, Q13, Q14, Q15 and measuring the voltage at the respective node N1, N2, N3, N4 at port $V_{sen}$. The CCV is measured by turning on the respective switching device Q12, Q13, Q14, Q15 and measuring the voltage the respective switching device Q12, Q13, Q14, Q15 and measuring the voltage at the respective node N1, N2, N3, N4 at port $V_{sen}$. In this case, since a nominal 750 milliamperes is being output by the regulator 24, the voltage drop at the port $V_{sen}$ will be equal to the voltage drop across the resistor R11 plus the voltage at the respective node N1, N2, N3, N4. The voltage at the node N1, N2, N3, N4 will vary as a function of the voltage drop across the size detection resistors R1, R2, R3 and R4. As mentioned above if a battery cell, for example, a AA battery cell, is populated in one of the pockets P1, P2, P3, P4, the voltage at the node N1, N2, N3, N4 will be the nominal voltage of the battery cell itself, for example, 1.2–1.5 volts DC. In this case since no battery cells are populated in the pockets P4, P5, P6, P7, there will be no current through and thus no voltage drop across the size detection resistors R1, R2, R3 and R4. Alternatively, when a battery cell, for example a AAA battery cell, populates one of the pockets P5, P6, P7, P8, the voltage at the node N1, N2, N3, N4, will be the sum of the nominal voltage of the battery cell populating one of the pockets P5, P6, P7, P8, for example 1.2–1.5 volts DC plus the voltage drop across the size detection resistor R1, R2, R3 and R4. In the example mentioned above, the size detection resistor R1, R2, R3 and R4 is sized so that at the nominal current, for example, 750 milliamperes, the voltage drop across it is about 0.5 volts DC. Thus, using the example mentioned above the CCV at the nodes N1, N2, N3, N4 will vary by, for example, 0.5 volts DC, depending on which pocket of a particular channel 28, 30, 32, 34 is populated with a battery cell. As such in step 136, the system checks the difference between the CCV and the OCV. If the difference is not greater than, for example, 0.287 volts DC, a first flag, for example a AA battery flag, is set in step 138. Alternatively, if the difference is greater than, for example 0.287 volts DC, a second flag, for example, a AAA flag, is set in step 140.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. A multiple cell battery charger comprising:

a regulator for receiving a predetermined input voltage and supplying a regulated supply of DC voltage at its output;

at least one charging circuit, each charging circuit configured to charge one or more battery cells, said charging circuit electrically coupled to said regulator comprising:

a first pair of terminals for coupling to a first battery cell defining a first pocket;

a second pair of terminals for coupling to a second battery cell defining a second pocket;

a size detection resistor serially coupled to said second pair of battery terminals, said first pocket and said serial combination of said size detection resistor and said second pair of battery terminals coupled together in parallel defining a parallel combination;

a switching device, which forms a part of said charging circuit, serially coupled to said parallel combination for selectively connecting and disconnecting said parallel combination to said charging circuit; and a microprocessor operatively coupled to said first and second pairs of terminals for monitoring the voltage applied to said pairs of terminals and selectively controlling the switching device to determine which pockets are populated with battery cells and electronically determining their sizes.

2. The multiple cell battery charger as recited in claim 1, wherein said charging circuit automatically charges said battery cells according charging characteristics for the cell size determined to be populating the pocket.

3. The multiple cell battery charger as recited in claim 1, wherein said first pocket is configured to receive battery cells of a first predetermined size.

4. The multiple cell battery charger as recited in claim 1, wherein said second pocket is configured to receive battery cells of a second predetermined size.

5. The multiple cell battery charger as recited in claim 4, wherein one or both of said predetermined sizes are fixed.

6. The multiple cell battery charger as recited in claim 4, wherein said first and second predetermined sizes are different.

7. The multiple cell battery charger as recited in claim 1, wherein said charging circuit is configured to enable said microprocessor to sense the voltage across said size detection resistor and determine whether a battery cell is populating said second packet as a function of the voltage across said size detection resistor.

8. The multiple cell battery charger as recited in claim 7, wherein said size detection resistor is sized so that a nominal charging current flows through said size detection resistor when a battery cell of said second predetermined size is disposed in said second pocket.

9. The multiple cell battery charger as recited in claim 3, wherein said first predetermined size corresponds to AAA.

10. The multiple cell battery charger as recited in claim 3, wherein said second predetermined size corresponds to AA.

* * * * *

UNITED STATES PATENT AND TRADEMARK OFFICE

CERTIFICATE OF CORRECTION

PATENT NO. : 7,023,175 B2
APPLICATION NO. : 10/896654
DATED : April 4, 2006
INVENTOR(S) : Guang et al.

It is certified that error appears in the above-identified patent and that said Letters Patent is hereby corrected as shown below:

Claim 1, Column 11, line 2: add a comma after "parallel", i.e. --together in parallel, defining a parallel combination--;

Claim 1, Column 11, line 12: add the word --relative--, i.e. --determining their relative sizes--;

Claim 2, Column 11, line 15, add the word --to--, i.e. --battery cells according to charging characteristics--.

Signed and Sealed this

Twenty-second Day of May, 2007

JON W. DUDAS
*Director of the United States Patent and Trademark Office*